United States Patent
Lowe (10) Patent No.: US 9,471,825 B2
(45) Date of Patent: Oct. 18, 2016

(54) METHOD OF MANUFACTURING AN ELECTRONIC CARD

(71) Applicant: ZWIPE, AS, Oslo (NO)

(72) Inventor: Peter Robert Lowe, Peyton, CO (US)

(73) Assignee: Zwipe AS, Oslo (NO)

(*) Notice: Subject to any disclaimer, the term of this patent is extended or adjusted under 35 U.S.C. 154(b) by 126 days.

(21) Appl. No.: 14/394,504

(22) PCT Filed: Mar. 14, 2013

(86) PCT No.: PCT/EP2013/055299
§ 371 (c)(1),
(2) Date: Oct. 15, 2014

(87) PCT Pub. No.: WO2013/160011
PCT Pub. Date: Oct. 31, 2013

(65) Prior Publication Data
US 2015/0049925 A1    Feb. 19, 2015

Related U.S. Application Data

(60) Provisional application No. 61/637,424, filed on Apr. 24, 2012.

(30) Foreign Application Priority Data

May 17, 2012   (GB) .................................. 1208680.7

(51) Int. Cl.
*G06K 9/00* (2006.01)
*G06K 19/07* (2006.01)
(Continued)

(52) U.S. Cl.
CPC .......... *G06K 9/0002* (2013.01); *B32B 37/1284* (2013.01); *B32B 37/182* (2013.01);
(Continued)

(58) Field of Classification Search
CPC ........... G06K 9/0002; G06K 9/00087; G06K 19/0718; G06K 19/18; B32B 37/182; B32B 37/1284; B32B 38/0004
See application file for complete search history.

(56) References Cited

U.S. PATENT DOCUMENTS 6,214,155 B1    4/2001   Leighton
6,881,605 B2    4/2005   Lee et al.
(Continued)

FOREIGN PATENT DOCUMENTS

EP    1326196 A1    7/2003
EP    2073154 A1    6/2009
(Continued)

OTHER PUBLICATIONS

Korean Intellectual Property Office, Notice of Grounds for Rejection, Mar. 21, 2016, for Korean Application No. 10-2014-7032791, Inventor Lowe, Peter Robert, pp. 1-5.

*Primary Examiner* — Leon Flores
(74) *Attorney, Agent, or Firm* — Sutherland Asbill & Brennan LLP (57) ABSTRACT

The present application relates to overcoming some of the physical problems associated with putting a biometric sensor into the body of an electronic card, such as a smart card. A disclosed method of manufacturing an electronic card including a biometric sensor may include providing a preformed card body including a circuit having contacts for connection to a biometric sensor, the contacts being embedded within the preformed card body, removing material from the preformed card body to form a cavity in the preformed card body to expose the contacts, coating walls of the cavity with an adhesive epoxy, and connecting a biometric sensor to the contacts using an conductive epoxy. Also disclosed is an electronic card including a biometric sensor manufactured by this method.

19 Claims, 4 Drawing Sheets

(51) Int. Cl.
  *B32B 37/12* (2006.01)
  *B32B 37/18* (2006.01)
  *B32B 38/00* (2006.01)
  *G06K 19/18* (2006.01)

(52) U.S. Cl.
  CPC ....... *B32B38/0004* (2013.01); *G06K 9/00087* (2013.01); *G06K 19/0718* (2013.01); *G06K 19/18* (2013.01); *Y10T 156/1064* (2015.01)

(56) References Cited

U.S. PATENT DOCUMENTS

| | | |
|---|---|---|
| 8,012,809 B2 | 9/2011 | Reed |
| 2003/0063445 A1* | 4/2003 | Fischbach ............ G06K 9/0002 |
| | | 361/752 |
| 2005/0150947 A1 | 7/2005 | Goodman et al. |
| 2006/0213970 A1 | 9/2006 | Trajkovic et al. |
| 2006/0227523 A1* | 10/2006 | Pennaz .................. H01M 6/40 |
| | | 361/783 |
| 2008/0223925 A1 | 9/2008 | Saito et al. |
| 2010/0039234 A1 | 2/2010 | Soliven et al. |
| 2011/0233545 A1 | 9/2011 | Shin et al. |

FOREIGN PATENT DOCUMENTS

| | | |
|---|---|---|
| EP | 2842079 B1 | 6/2016 |
| JP | 2010-113578 | 5/2010 |
| KR | 2001-0069593 | 7/2001 |
| KR | 2003-0019481 | 3/2003 |
| KR | 2010-113578 | 5/2010 |
| TW | M407449 U1 | 7/2011 |
| WO | 97/34252 A1 | 9/1997 |
| WO | 03/017211 A2 | 2/2003 |
| WO | 2005/058004 A2 | 6/2005 |
| WO | 2007/110142 A1 | 10/2007 |
| WO | 2011/080262 A1 | 7/2011 |

* cited by examiner

METHOD OF MANUFACTURING AN ELECTRONIC CARD

TECHNICAL FIELD

The present invention relates to a method of manufacturing an electronic card, such as the type of card known as a smart card. Particularly, the present invention relates to a method of manufacturing an electronic card that includes a biometric sensor.

BACKGROUND OF THE INVENTION

A smart card is a pocket-sized card with an embedded integrated circuit. A smart card typically contains volatile and non-volatile memory and microprocessor components.

A typical smart card is manufactured by laminating a printed circuit assembly between two layers of plastic. Polyvinyl chloride (PVC) is commonly used for this purpose as it softens before it oxidises and, at suitably high temperatures and pressures, will flow and conform to the shape of components on the printed circuit assembly. When using PVC, or similar substances, the laminating temperatures required can be as high as 250° C.

Smart cards provide a way of authenticating the bearer of the card and carrying a secure message from the card to the reader. For example, if a "non-smart" credit card were to be lost or stolen, an unauthorised user would be able to use the credit card until the credit card is cancelled. Conversely, a "smart" credit card may includes many more levels of security that would prevent such use by an unauthorised user. One such security measure that may be used with a smart card is the analysis of biometric data to positively identify the bearer of the card.

A biometric security measure may be added to a smart card through the addition of a biometric sensor, such as a fingerprint reading sensor, on the card. In the case of a fingerprint reading sensor, when the card is to be used, the bearer presents their finger or thumb to the reader which then positively authenticates the owner of the finger or thumb.

The present invention aims to overcome some of the physical problems associated with putting a biometric sensor into the body of an electronic card, such as a smart card.

SUMMARY OF THE INVENTION

Viewed from a first aspect, the present invention provides a method of manufacturing an electronic card including a biometric sensor, the method comprising: providing a preformed card body including a circuit having contacts for connection to a biometric sensor, the contacts being embedded within the preformed card body; and forming a cavity in the preformed card body to expose the contacts.

With the method described above, a card body including a circuit is preformed by a conventional technique. The term circuit is intended to include any suitable electronic card circuit, such as a printed circuit board. In known electric card manufacturing techniques, any surface mounted parts are in place during formation of the card body and the card body is formed about these parts, leaving them exposed at the surface as required. With the current method contacts are connected to the circuit for a biometric sensor and, during the preforming, are embedded in the card body, i.e. completely surrounded by the card body material; however, the biometric sensor itself is not connected to the circuit when the card body is formed. After the card body has been preformed, a cavity is formed in the preformed card body in order to expose the contacts. The cavity allows for the biometric sensor to be subsequently connected to the card body.

Whilst metallic circuit components in a conventional electronic card circuit are able to withstand high temperature and pressure, such as those occurring in the lamination process used to form a typical electronic card, high temperature and pressure can cause damage to a biometric sensor, which may be a delicate, high-precision electronic device. Particularly, the sensor may soften and become distorted by the high temperature and there is a risk that parts of the sensor may be cracked by the high pressure.

Advantageously, in accordance with this aspect of the invention, the biometric sensor is not installed until after the card body is formed meaning that the biometric sensor is not exposed to any adverse conditions arising during the forming or processing of the card body, which might cause damage to the biometric sensor. This aspect of the invention thus allows for any conventional manufacturing process to be used in the construction of the card body, for example the PVC lamination technique described above, or the like.

The contacts are arranged for electrical connection to the biometric sensor. Hence, the number and layout of contacts may vary depending on the configuration of connection points in the sensor. Preferably the contacts are gold or gold plated.

The method may comprise connecting a biometric sensor to the contacts within the cavity. Preferably the biometric sensor is for identification of an authorised user of the electronic card. The electronic card may be arranged to be operable only when the biometric sensor provides an indication of an authorised user.

In a preferred embodiment, the biometric sensor is a fingerprint reader. Preferably, the biometric sensor is a FPC1080A biometric fingerprint swipe sensor, manufactured by Fingerprint Cards AB of Sweden.

Preferably walls of the cavity are coated with an adhesive epoxy prior to the biometric sensor being inserted. The adhesive epoxy seals the sensor in place to prevent the biometric sensor becoming dislodged and being disconnected from the circuit.

Preferably, the biometric sensor is connected to the contacts using a conductive epoxy. This ensures a good ohmic contact between the sensor and the contacts within the cavity. The conductive epoxy should be selected so that its curing temperature is low enough not to damage the biometric sensor. For example, the conductive epoxy may have a curing temperature of less than 100° C., more preferably less than 60° C., this being a typical maximum designed operating temperature for many biometric sensors. An epoxy that cures at room temperature may be used.

The conductive epoxy may be an anisotropic conductive epoxy. The use of anisotropic conductive epoxy means that substantial conduction does not occur between the contacts even if any of the epoxy spills over between the contacts. This allows more freedom in selecting the technique/apparatus that applies the conductive epoxy, since less accuracy is required.

The step of forming the cavity preferably comprises removing material from the preformed card body to form the cavity. Particularly, the cavity may be milled using a precision end mill or, more preferably, a laser mill. A laser milling machine is very precise and can be adjusted to remove just the plastic and not the contact material, which is more difficult with conventional mechanical milling.

The depth of the milling is preferably designed to end just at the level of the circuit within the card body such that the contacts are exposed.

The preformed card body may be formed by a method comprising: providing a first plastic layer; providing a circuit on the first plastic layer, the circuit having the contacts for connection to the biometric sensor; providing a second plastic layer on the first plastic layer with the circuit interposed between the first plastic layer and the second plastic layer; and laminating the first plastic layer and the second plastic layer to form the preformed card. The laminating may be performed at a temperature of at least 135° C. and/or a pressure of at least 5 MPa, and is preferably performed at a temperature of at least 150° C. and a pressure of at least 6.5 MPa. In some embodiments, additional layers may be provided above and/or below the first and second layers prior to lamination.

The present method is particularly advantageous when the above manufacturing method is used to produce the card body. Particularly, the lamination process above allows for materials such PVC to be used for the card body. With the method of the present aspect, it is possible for such a lamination technique to be used to provide an electronic card including heat sensitive parts. Additionally, by preforming the card body in this manner, known card forming techniques may be used to manufacture the card body allowing the manufacturing method of the present aspect to be compatible with existing techniques.

The circuit may include a processor and a memory. The memory may be arranged to store biometric information relating to bearer of the card and the processor may be arranged to compare the stored biometric information to biometric information acquired by the biometric sensor. Thus, the processor is preferably arranged to determine if the user is an authorised user based on an indication provided by the biometric sensor. The processor and memory may also be arranged to store and transmit other information associated with the electronic card to a reader, wherein the transmitted information does not include the stored biometric information and the biometric information acquired by the biometric sensor. The processor is preferably arranged such that the biometric information acquired from the sensor is never transferred from the card during normal operation. The processor preferably controls operation of the electronic card.

The method of the above aspect may be used to manufacture electronic cards for a number of purposes where it is necessary for the identity of the bearer of the electronic card to be verified. For example, the electronic card manufactured in accordance with the above aspect may be any one of: an access card; a credit card; a debit card; a pre-pay card; a loyalty card; an identity card; and a cryptographic card. As discussed above, the electronic card is preferably arranged to be inoperable if the biometric sensor does not provide an indication of an authorised user. Thus, the electronic card may provide its desired function only when the biometric information confirms that the user is authorised. For example, where the electronic card is an access card, the access card may provide access only when the user is authorised.

Further, the method of the above aspect may be used to manufacture electronic cards which use any one or more of: an RFID circuit and/or an electrical contact pad.

Viewed from a second aspect the present invention provides an electronic card including a circuit having contacts and a biometric sensor connected to the contacts, the electronic card having been formed by any of the above methods.

In a preferred embodiment, the electronic card of the second aspect comprises: a card body; a circuit embedded within the card body, the circuit having contacts; a cavity in the card body that exposes the contacts and a biometric sensor mounted within the cavity, wherein the biometric sensor is electrically connected to the contacts, preferably by a conductive epoxy.

The contacts are in electrical connection with the biometric sensor. Hence, the number and layout of contacts preferably correspond to the configuration of connection points in the sensor. Preferably the contacts are gold or gold plated.

Preferably the biometric sensor is electrically connected to the contacts by a conductive epoxy. The conductive epoxy ensures a good ohmic contact between the sensor and the contacts within the cavity. The conductive epoxy being anisotropic means that substantial conduction does not occur between the contacts if any of the epoxy spills over between the contacts.

Preferably the biometric sensor is for identification of an authorised user of the electronic card. The electronic card may be arranged to be operable only when the biometric sensor provides an indication of an authorised user. In a preferred embodiment, the biometric sensor is a fingerprint reader.

Preferably the electronic card comprises an adhesive epoxy between walls of the cavity and the biometric sensor. The adhesive epoxy seals the sensor in place to prevent the biometric sensor becoming dislodged and being disconnected from the circuit.

The circuit may include a processor and a memory. The memory may be arranged to store biometric information relating to bearer of the card and the processor may be arranged to compare the stored biometric information to biometric information acquired by the biometric sensor. Thus, the processor is preferably arranged to determine if the user is an authorised user based on an indication provided by the biometric sensor. The processor and memory may also be arranged to store and transmit other information associated with the electronic card to a reader. The processor preferably controls operation of the electronic card.

The electronic card may be any one of: an access card; a credit card; a debit card; a pre-pay card; a loyalty card; an identity card; and a cryptographic card. The electronic card is preferably arranged to be inoperable if the biometric sensor does not provide an indication of an authorised user.

These and other features and improvements of the present application and the resultant patent will become apparent to one of ordinary skill in the art upon review of the following detailed description when taken in conjunction with the several drawings and the appended claims.

BRIEF DESCRIPTION OF THE DRAWINGS

Certain preferred embodiments of the present invention will now be described in greater detail by way of example only and with reference to the accompanying schematic drawings, in which.

The accompanying drawings are not to scale and certain features have been emphasised. Particularly, the thicknesses of the card body and of the circuit have been enlarged so as to more clearly illustrate the present invention.

DETAILED DESCRIPTION

Smart cards are generally of a similar size to a conventional credit card and have a similar look and feel. Conventional credit cards are manufactured in accordance with international standard ID-1 of ISO/IEC 7810, that is to say having dimensions of 3⅜ inches by 2⅛ inches (approx. 86 mm by 54 mm) and a thickness of 30 mil (approx. 0.75 mm). In some embodiments, the smart card may be thicker than a conventional credit card in order to accommodate a circuit and biometric sensor.

Smart cards may be produced as one of two physical types.

In contact smart cards, often known as chip cards, metal contacts are brought to the surface of the card in a predetermined pattern to form a contact pad, which is accessible from the outside of the card. These contacts are connected to a microprocessor inside of the card. Smart cards of the first type are commonly used by being slid into a recess of a card reader such that spring loaded contacts in the card reader make contact with the contact pad on the card in order to read the contents of the microprocessor.

In non-contact smart cards, often known as proximity cards, the contents of the microprocessor are transmitted to the reader using non-contact communication technology. One example of such is radio-frequency identification (RFID), where an antenna is formed within the body of the card and radio-frequency electromagnetic fields are used by a reader to read of the contents of the microprocessor. Encryption may be employed in smart cards of this type to ensure secure transmission of messages between the card and the reader.

Figure 1:
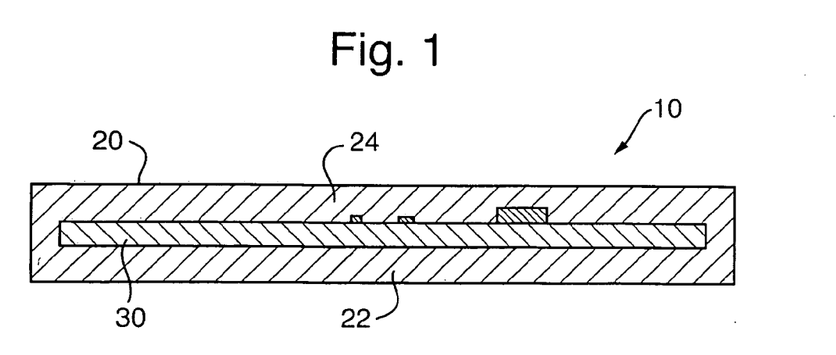
FIG. 1 shows a partially cut-away side view of a non-contact smart card.

FIG. 1 shows a partially cut-away side view of a non-contact smart card in which no modifications have been made to accommodate a biometric sensor.

The smart card 10 comprises a card body 20 and a circuit 30 enclosed within the card body. The circuit 30 is in the form of a printed circuit board, which is preferably made from poly amide or FR-4 grade glass-reinforced epoxy laminate.

The circuit 30 is laminated between at least two layers of plastic 22, 24. The at least two layers of plastic 22, 24 include an first layer of plastic 22 and a second layer of plastic 24 with the circuit 30 sandwiched between the first and second layers 22, 24. The layers of plastic 22, 24 are made of PVC; however, other plastics may be used. Examples of other suitable plastics include polyester, acrylonitrile-butadiene-styrene (ABS), and any other suitable plastic. Additionally, plasticisers or dyes may be added to the plastic to achieve a desired look and feel.

The smart card 10 of FIG. 1 is produced by a hot lamination method, for example as described in U.S. Pat. No. 6,586,078 B2. A suitable hot lamination method could comprise the following steps:

forming a core by providing first and second layers of plastic 22, 24 and positioning the circuit 30 between the first and second layers of plastic 22, 24 to thus form the core;

placing the core in a laminator;

applying a heat cycle to the core in the laminator to liquefying or partially liquefying the layers of plastic 22, 24, the heat cycle operating at a temperature of between 135° C. and 250° C.;

increasing a laminator ram pressure in combination with the heat to a pressure of approximately 6.5 MPa;

applying a cooling cycle to the core in the laminator with an associated increase in ram pressure of approximately 25% until the core has cooled to approximately 5° C. to 20° C.; and removing the core from the laminator.

Conventional processing techniques, that would be well known to the person skilled in the art, may then be applied to the core to form the card body 20. Such processing techniques may include inking, the formation of an overlaminate film, or the like.

Figure 2:
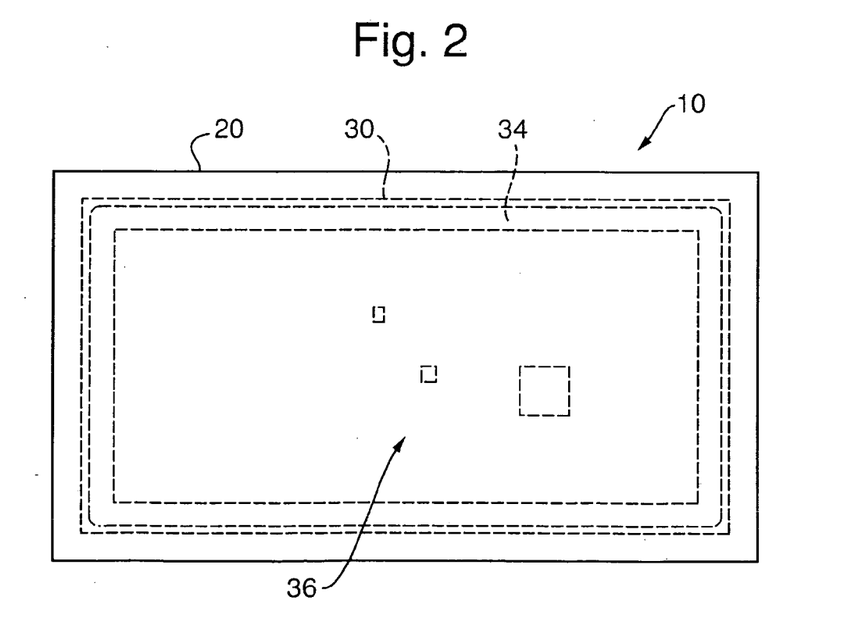
FIG. 2 shows a partially cut-away plan view of the smart card of FIG. 1.

FIG. 2 shows a partially cut-away plan view of the smart card of FIG. 1 with the internal components shown.

An antenna 34 is connected to the circuit 30. The antenna 34 is used to communicate with a card reader, which is external to card 10. The antenna 34 may be formed by etching a suitable pattern onto a copper cladding of the printed circuit board.

The circuit 30 also includes a number of additional components 36. These include a processor and a memory (not shown). The memory is arranged to store information associated with the smart card 10. For example, this may include the identity of a bearer of the smart card 10, account information of the bearer of the smart card 10, etc. The processor is arranged to control operation of the smart card. Particularly, subject to verification of the bearer of the smart card 10, for example by use of a password, the processor is arranged to communicate the data stored on the memory to a card reader.

The additional components 36 may, in some embodiments, include a battery which is configured to power the memory and processor. Alternatively, or in addition to the battery, the card may be arranged to be powered via a contact pad external to the smart card 10 or to draw power from the antenna 34 when it is energised by a card reader.

FIGS. 3 to 8 illustrate an embodiment of a method of manufacturing an electronic card including a biometric sensor in accordance with the present invention. Whilst the described embodiments relate to a non-contact smart card, the present invention is not limited to such. Particularly, those skilled in the art will understand that a method of manufacturing a contact smart card or any other electronic card is also within the scope of the claims.

Figure 3:
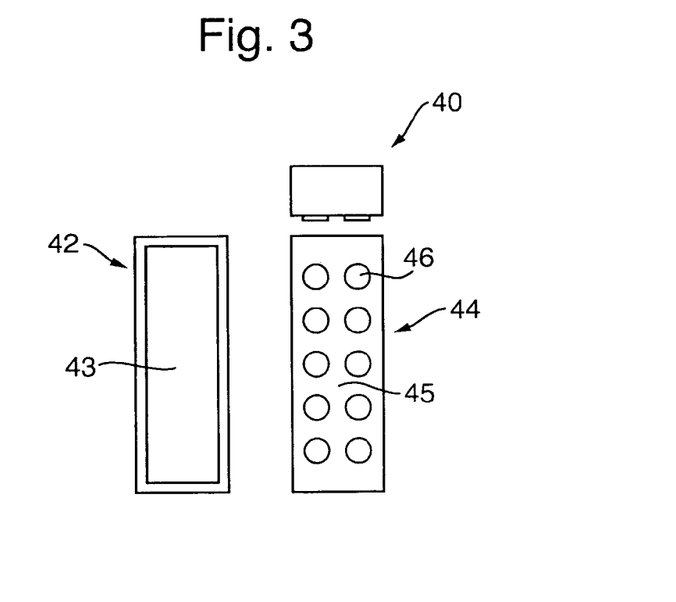
FIG. 3 shows a biometric sensor.

FIG. 3 shows a biometric sensor.

In this embodiment, the biometric sensor 40 is of the fingerprint swipe type. An example of a suitable fingerprint swipe type biometric sensor 40 is a FPC1080A biometric fingerprint swipe sensor, manufactured by Fingerprint Cards AB of Sweden. The biometric sensor 40 includes a sensor side 42 and a contact side 44, preferably on opposing sides of the biometric sensor 40.

On the sensor side 42 of the biometric sensor is a sensor area 43. In the case of a fingerprint swipe type sensor, the sensor area 43 is an area over which the user may run their finger or thumb in order for the fingerprint swipe type sensor to acquire biometric data. The direction of swipe is in a direction perpendicular to the length of the sensor.

On the contact side 44 of the biometric sensor is a contact area 45. This preferably include an array of at least two contacts 46 and, in this embodiment, includes ten contacts 46. In a preferred embodiment, when using the FPC1080A sensor, the contact area 45 includes thirty two contacts 46. The contacts 46 allow access electrically to the internal components of the biometric sensor 40. The contacts 46 are preferably made of gold or are gold plated. The use of gold reduces deterioration of the contacts over time.

Figure 4:
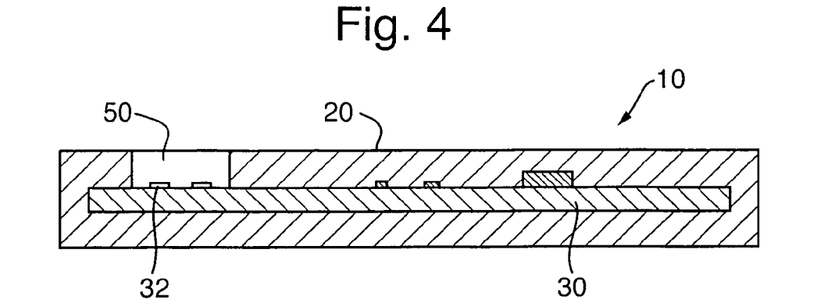
FIG. 4 shows a partially cut-away side view of a smart card with a cavity formed to receive the biometric sensor of FIG. 3.
Figure 5:
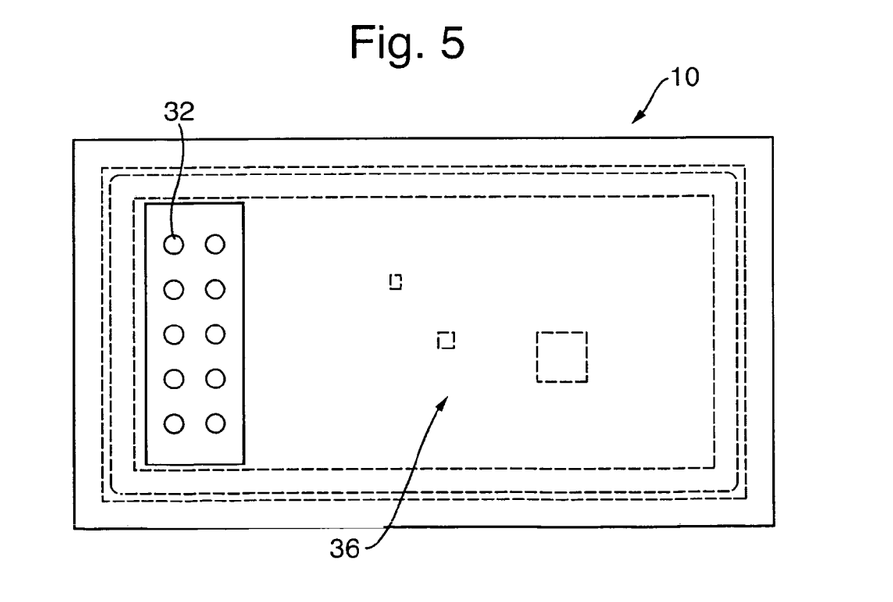
FIG. 5 shows a partially cut-away plan view of the smart card of FIG. 4.

FIGS. 4 and 5 shows a partially cut-away side view and a partially cut-away plan view, respectively, of a smart card, in which a cavity has been formed to receive a biometric sensor. The body of the smart card has been manufactured in the same manner to that used to manufacture the smart card shown in FIG. 1.

The smart card includes a card body 20 in which a circuit 30 is embedded. Contacts 32 are provided in the circuit 30 and are arranged to align with the contacts 45 on the biometric sensor 40, when the biometric sensor 40 is in place. The contacts 32 in the circuit 30 are also made of gold or are gold plated. The contacts are preferably conductive pads.

A cavity 50 is formed in the card body 20 to expose the contacts 32 in the circuit 30. The cavity 50 is formed on an upper surface of smart card body 20 and is sized substantially in conformity with the shape of the biometric sensor 40, such that the biometric sensor 40 will just fit within the cavity 50.

In this embodiment, the cavity 50 is milled into the surface of the card body 20. This may be done using a precision end mill or, more preferably, a laser mill. The depth of the milling is set so that the base of the cavity 50 is at the level of the circuit 30 within the card body 20, such that the contacts 32 are exposed.

The circuit 30 of the smart card 10 includes various components 36. These include a memory and processor (not shown). The memory is arranged to store biometric information relating to a bearer of the smart card 10 and the processor is arranged to compare the biometric information stored on the memory to biometric information acquired by the biometric sensor 30 and communicated to the contacts 32 of the circuit 30. The processor is therefore arranged to determine if the user is an authorised user based on an indication provided by the biometric sensor. The memory and processor may also serve the same functionalities as the memory and processor described with reference to FIG. 2 and may be powered in the same manner.

Figure 6:
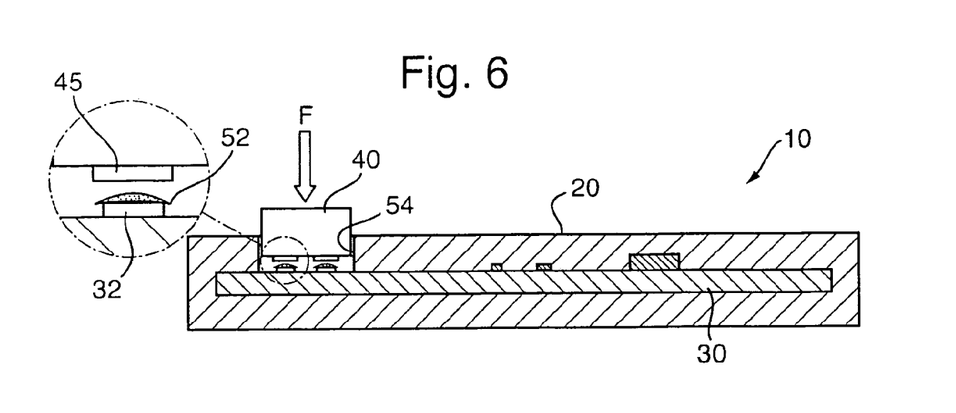
FIG. 6 shows a biometric sensor being inserted into the smart card of FIG. 4.

FIG. 6 shows the biometric sensor being inserted into the smart card body. The magnified area shows a contact junction between the contacts on the biometric sensor and the contacts in the circuit A conductive epoxy 52 is applied to the surface of the contacts 32 in the circuit 30 prior to the biometric sensor 40 being inserted. A suitable conductive epoxy is type SEC1222 epoxy, manufactured by Resinlab, LLC of Wisconsin USA, which cures at room temperatures (approx. 25° C.).

Alternatively, a conductive epoxy 52 having a strongly anisotropic characteristic may be used. This is beneficial when the contacts 46 on the biometric sensor 40 are very close together because it provides the required conductivity between the biometric sensor 40 and the contacts 32 in the circuit 30, whilst ensuring that even if the conductive epoxy 52 flows between adjacent contacts 32, it will not form any appreciable conductive path between them.

Interior walls 54 of the cavity are coated with an adhesive epoxy 56 prior to the biometric sensor 40 being inserted. The adhesive epoxy 56 seals the biometric sensor 40 in place to prevent the biometric sensor 40 from becoming dislodged and becoming disconnected from the contacts 32 of the circuit 30.

The biometric sensor 40 is then aligned with the cavity 50 and the biometric sensor 40 is pushed into the cavity 50, using a force F, such that the contacts 45 on the biometric sensor 40 and the contacts 32 in the circuit 30 are brought into electrical contact through the conductive epoxy 56.

The conductive epoxy 52 and adhesive epoxy 56 preferably cure without heating. However, alternatively, one or both of the conductive epoxy 52 and adhesive epoxy 56 may require heat curing where the curing temperature of the conductive epoxy 52 and/or adhesive epoxy 56 is below a safe temperature of the biometric sensor 40, for example below 60° C., which is the maximum operating temperature of the FPC1080A sensor used in the preferred embodiment. Higher temperatures may be possible for short time periods and/or for different sensor types.

Figure 7:
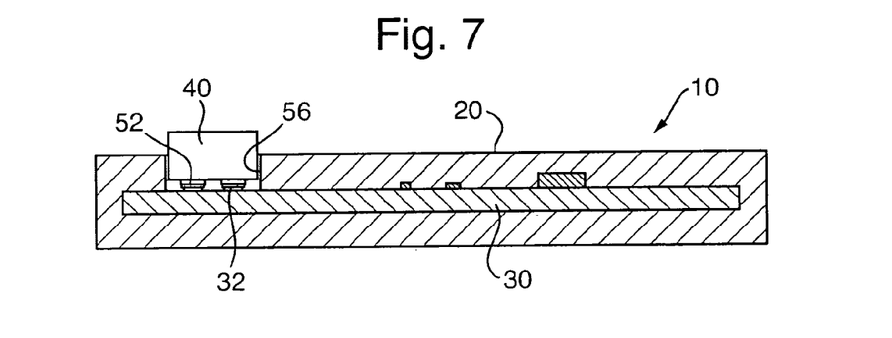
FIG. 7 shows a biometric sensor assembled into the smart card body of FIG. 4.
Figure 8:
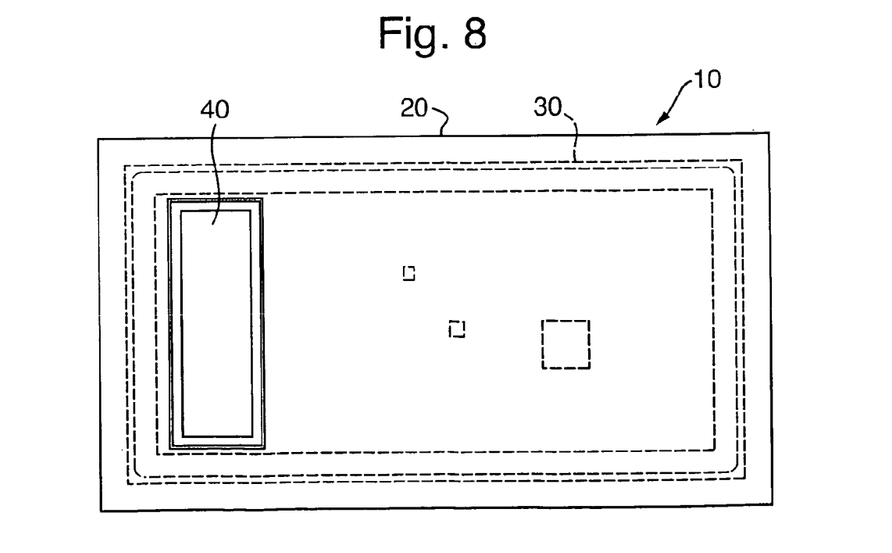
FIG. 8 shows a partially cut-away plan view of the smart card of FIG. 7.

FIGS. 7 and 8 show the biometric sensor assembled into the smart card body.

The biometric sensor 40 has been formed in the smart card 10 without having experienced any high temperatures or pressures. The conductive epoxy 52 and adhesive epoxy 56 have been cured and hence secure the biometric sensor 40 within the card body 20.

It should be apparent that the foregoing relates only to the preferred embodiments of the present application and the resultant patent. Numerous changes and modification may be made herein by one of ordinary skill in the art without departing from the general spirit and scope of the invention as defined by the following claims and the equivalents thereof.

The invention claimed is:

1. A method of manufacturing an electronic card including a biometric sensor, the method comprising:
    providing a preformed card body including a circuit having contacts configured to connect to the biometric sensor, the contacts being embedded within the preformed card body; and
    forming a cavity in the preformed card body to expose the contacts.

2. A method as recited in claim 1, further comprising:
    installing a biometric sensor in the cavity.

3. A method as recited in claim 2, wherein the biometric sensor is a fingerprint reader.

4. A method as recited in claim 2, further comprising:
    connecting the biometric sensor to the contacts using a conductive epoxy.

5. A method as recited in claim 4, wherein the conductive epoxy is an anisotropic conductive epoxy.

6. A method as recited in claim 2, further comprising:
    coating the walls of the cavity with an adhesive epoxy prior to installing the biometric sensor.

7. A method as recited in claim 1, wherein forming the cavity comprises removing material from the preformed card body to form the cavity.

8. A method as recited in claim 7, wherein the material is removed from the preformed card body using a precision end mill or a laser mill.

9. A method as recited in claim 1, wherein providing the preformed card body comprises forming the preformed card body using a hot lamination process.

10. A method as recited in claim 9, wherein the hot lamination process comprises:
  providing a first plastic layer;
  providing the circuit on the first plastic layer, the circuit having the contacts for connection to the biometric sensor;
  providing a second plastic layer on the first plastic layer with the circuit interposed between the first plastic layer and the second plastic layer; and
  laminating the first plastic layer and the second plastic layer to form the preformed card.

11. A method as recited in claim 9, wherein the laminating is performed at a temperature of at least 135° C. and/or a pressure of at least 5 MPa.

12. A method as recited in claim 1, wherein the electronic card is any one of: an access card; a credit card; a debit card; a pre-pay card; a loyalty card; an identity card; and a cryptographic card.

13. An electronic card including a circuit having contacts and a biometric sensor connected to the contacts, the electronic card having been formed by a method as recited in claim 1.

14. An electronic card, comprising:
  a card body;
  a circuit embedded within the card body, the circuit having contacts;
  a cavity in the card body that exposes the contacts; and
  a biometric sensor mounted within the cavity and electrically connected to the contacts.

15. An electronic card as recited in claim 14, wherein the biometric sensor is electrically connected to the contacts by a conductive epoxy.

16. An electronic card as recited in claim 15, wherein the conductive epoxy is an anisotropic conductive epoxy.

17. An electronic card as recited in claim 14, wherein the biometric sensor is a fingerprint reader.

18. An electronic card as recited in claim 14, wherein the circuit includes:
  a memory arranged to storing biometric information relating to at least one authorised user of the card; and
  a processor arranged to compare the stored biometric information to biometric information acquired by the biometric sensor to determine if a user of the card is one of the at least one authorised users.

19. An electronic card as recited in claim 14, wherein the electronic card is arranged to be inoperable if the processor does not indicate an authorised user.

* * * * *